United States Patent
El-Shaarawi et al.

(10) Patent No.: US 9,702,597 B1
(45) Date of Patent: Jul. 11, 2017

(54) SYSTEM AND METHOD FOR PREVENTING ABSORBENT CRYSTALLIZATION IN A CONTINUOUSLY OPERATING SOLAR-POWERED ABSORPTION COOLING SYSTEM WITH HYBRID STORAGE

(71) Applicant: KING FAHD UNIVERSITY OF PETROLEUM AND MINERALS, Dhahran (SA)

(72) Inventors: Maged A. I. El-Shaarawi, Dhahran (SA); Ali Abdulaziz Al-Ugla, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/046,473

(22) Filed: Feb. 18, 2016

(51) Int. Cl.
| | |
|---|---|
| F25B 27/00 | (2006.01) |
| F25B 15/00 | (2006.01) |
| F25B 49/04 | (2006.01) |
| F25B 25/00 | (2006.01) |
| F24F 5/00 | (2006.01) |

(52) U.S. Cl.
CPC .......... *F25B 27/007* (2013.01); *F24F 5/0014* (2013.01); *F25B 15/002* (2013.01); *F25B 25/005* (2013.01); *F25B 49/043* (2013.01); *F24F 2005/0067* (2013.01); *F25B 2500/29* (2013.01); *F25B 2600/2507* (2013.01); *F25B 2700/2111* (2013.01)

(58) Field of Classification Search
CPC ...... F25B 15/06; F25B 17/00; F25B 2400/24; F25B 25/005; F25B 27/007; F25B 15/002; F25B 27/002; F24F 5/0014; F24F 2005/067

See application file for complete search history.

(56) References Cited

U.S. PATENT DOCUMENTS

| | | | | | |
|---|---|---|---|---|---|
| 5,586,447 | A | * | 12/1996 | Sibik | F25B 15/06 62/141 |
| 6,651,443 | B1 | * | 11/2003 | Meckler | F01K 23/10 60/39.182 |
| 8,720,216 | B1 | * | 5/2014 | Said | F25B 15/06 62/113 |
| 9,441,863 | B2 | * | 9/2016 | Said | F25B 17/02 |
| 9,488,394 | B1 | * | 11/2016 | El-Shaarawi | F25B 27/007 |

(Continued)

FOREIGN PATENT DOCUMENTS

| | | |
|---|---|---|
| CN | 101666529 B | 6/2011 |
| CN | 102353178 B | 7/2013 |

OTHER PUBLICATIONS

Syed et al, Alternative designs for a 24-h operating solar-powered absorption refrigeration technology, 2012.*

(Continued)

*Primary Examiner* — Elizabeth Martin
(74) *Attorney, Agent, or Firm* — Oblon, McClelland, Maier & Neustadt, L.L.P.

(57) ABSTRACT

A solar powered absorption cooling system employing refrigerant-absorbent solutions such as water and lithium bromide and hybrid storage capabilities, and a method of employing the system in refrigeration and air conditioning units. The system includes a first temperature control valve and second temperature control valve that together regulate the flow of solar heating fluid into the generator and substantially reduce absorbent crystal formation.

20 Claims, 1 Drawing Sheet

(56) References Cited

U.S. PATENT DOCUMENTS

2002/0053214 A1* 5/2002 Melendez-Gonzalez F24F 5/0046
62/235.1
2015/0143827 A1* 5/2015 Said ........................ F25B 17/02
62/101

OTHER PUBLICATIONS

A.A. Al-Ugla, et al., "Alternative designs for a 24-hours operating solar-powered LiBr-water absorption air-conditioning technology", International Journal of Refrigeration, vol. 53, May 2015, pp. 90-100 (Abstract only).

* cited by examiner

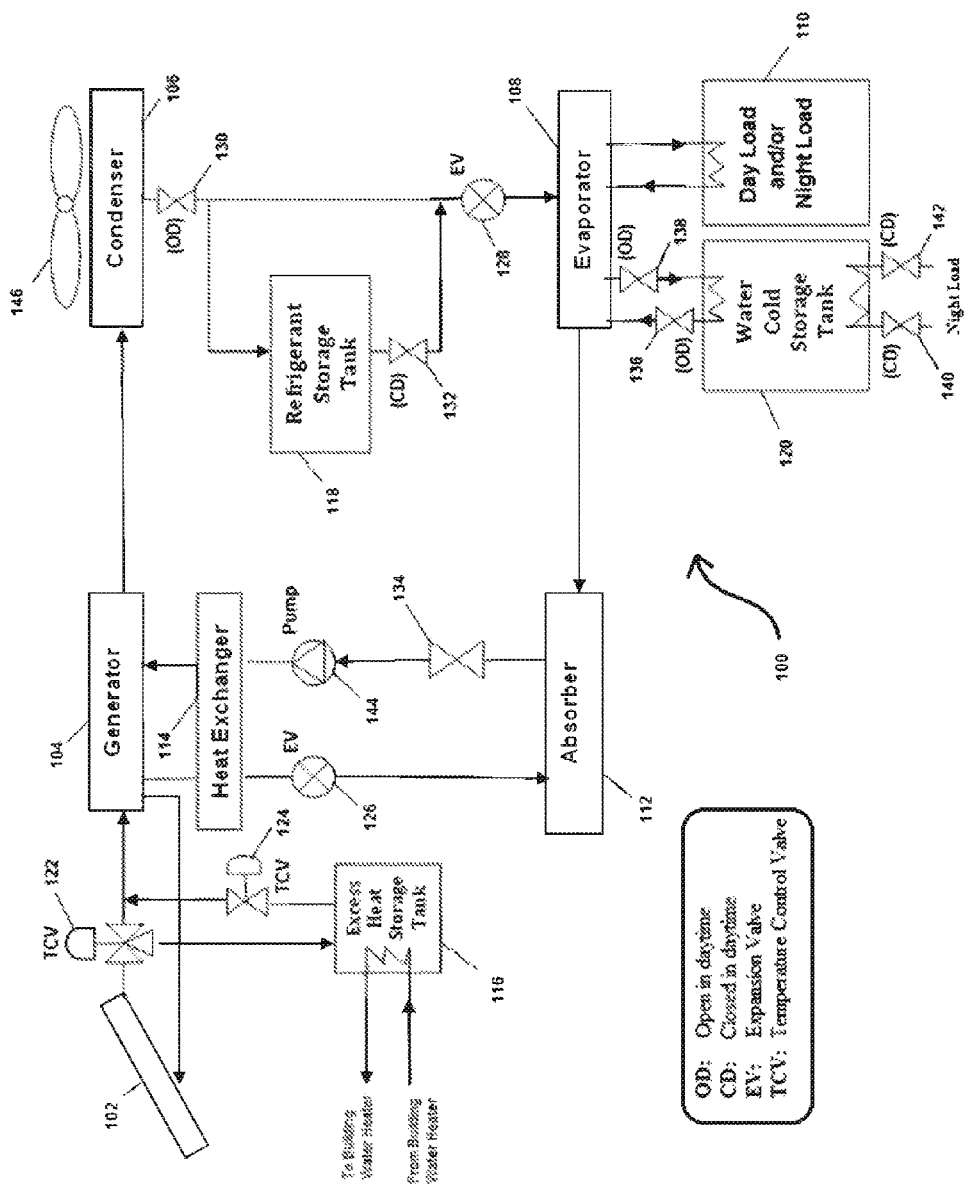

SYSTEM AND METHOD FOR PREVENTING ABSORBENT CRYSTALLIZATION IN A CONTINUOUSLY OPERATING SOLAR-POWERED ABSORPTION COOLING SYSTEM WITH HYBRID STORAGE

BACKGROUND OF THE INVENTION

Technical Field

The present disclosure relates to a continuously operating solar thermal absorption cooling system that prevents crystallization of an absorbent within an absorption-refrigerant solution and a method of providing a continuous cooling to at least one load using the system.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

High ambient temperatures have a direct impact on cooling demand; almost all buildings are cooled by conventional electricity powered air conditioning systems, which consume a large amount of electrical power. The development of an air conditioning system or general cooling system that may run on an alternative source of energy will save electrical energy, which is primarily produced by burning fossil fuels. Such systems will significantly aid in the reduction of carbon emission, thus reducing environmental pollution and global warming effects. Out of various renewable energy sources, solar energy proves to be the best candidate because of the coincidence of the maximum cooling load with the period of maximum solar radiation input. Solar energy is a free energy source which can be effectively used for many domestic and industrial applications including refrigeration and air conditioning.

Solar energy can be used to power cooling systems in two ways. First, solar energy can be converted into electricity by using photovoltaic cells, and then used to operate a conventional vapor compression cooling system. Second, solar energy can be used to heat a working fluid and generate a refrigerant in a generator of a vapor sorption (absorption or adsorption) cooling system. Solar electric cooling systems using photovoltaic cells are more expensive than solar thermal systems. Further evaluation of solar thermal cooling systems (absorption compared to adsorption systems) reveals that the absorption system is ~50% cheaper than the adsorption system in terms of capital cost.

The use of solar energy as a low grade thermal energy for absorption cycles has gained considerable attention among researchers over the last few decades. The major working pairs employed for solar absorption systems are lithium bromide-water (LiBr—$H_2O$) and water-ammonia ($H_2O$—$NH_3$). Although an ammonia-water system can produce cooling effects below zero degrees Celsius, it has certain disadvantages related to its lower coefficient of performance (COP), higher generator inlet temperature, higher pumping power and a more complex system that places restrictions on it uses in various applications.

Solar energy can be effectively utilized for cooling purposes by using these absorption systems. However, the greatest challenge in utilizing solar energy for uninterrupted cooling is its unavailability during the nighttime. Solar collectors are only able to gather energy during daylight hours at times of high solar heat input. In order to meet the uninterrupted cooling needs and extend the operation hours of these systems, they must be integrated with a storage system and energy storage tanks that will compensate for needs during nighttime operation and/or times of low solar heat input.

The analysis of storage systems for solar cooling purposes has been an important research topic. Research has indicated that thermal storage integrated into solar cooling systems increases the cooling availability and capacity, while improving the overall performance. Results have indicated that a reasonable sized cold storage tank can reduce the capacity of the chiller, without significantly affecting the system's energy performance. Similarly, analysis has indicated that a continuously operating solar powered absorption system with refrigerant storage is a suitable alternative device. Systems that must operate at high ambient temperatures and times of high thermal input must be able to efficiently gather enough energy (i.e. hot thermal, cold thermal, refrigerant and combinations) to provide for continuous cooling. Operations at these conditions can result in performance degradation, crystallization of the adsorbent, as well as high water consumption for heat rejection to the environment. Preventing crystallization in solar-powered simple salt and water systems, such as lithium bromide salt and water, is one of the most important design factors necessary to improve and maximize the system's performance.

In view of the forgoing, one object of the present disclosure is to provide an alternate design for a day and night continuously operating solar powered absorption cooling system that significantly reduces or eliminates absorbent crystallization. The system possesses hybrid storage (cold and refrigerant) facilities for continuous (24 hours a day) operation and an excess heat storage tank governed by two temperature control valves that control and prevent crystallization. A further aim of the present disclosure is to provide a method for continuously cooling at least one load using the system as described herein.

BRIEF SUMMARY OF THE INVENTION

According to a first aspect, the present disclosure relates to an absorption cooling system comprising: i) a plurality of solar collectors configured to obtain energy and transfer that energy as heat to a heating fluid, ii) a generator comprising a dilute absorbent-refrigerant solution comprising an absorbent dissolved in a first amount of a refrigerant, wherein the generator is configured to receive the heating fluid from the solar collectors and release a vapor refrigerant from the dilute absorbent-refrigerant solution, iii) a condenser configured to receive and condense the vapor refrigerant from the generator to form a liquid refrigerant, iv) an evaporator configured to receive the liquid refrigerant from the condenser and provide the refrigerant and a cooling fluid, wherein the cooling fluid cools at least one load, v) an absorber configured to receive the refrigerant from the evaporator and a concentrated absorbent-refrigerant solution comprising the absorbent dissolved in a second amount of the refrigerant from the generator to reform the dilute absorbent-refrigerant solution, vi) a heat exchanger located between the generator and the absorber, wherein heat is exchanged between the concentrated absorbent-refrigerant solution flowing from the generator to the absorber and the dilute absorbent-refrigerant solution flowing from the absorber to the generator, vii) a first storage tank located downstream of the solar collectors and upstream of the generator, which is configured to store the heating fluid, viii)

a second storage tank located downstream of the condenser and upstream of the evaporator, which is configured to store the liquid refrigerant, ix) a third storage tank located downstream of the evaporator, which is configured to store the cooling fluid, x) a first temperature control valve located between the solar collectors and the first storage tank having an open and a closed mode, xi) a second temperature control valve located between the first storage tank and the generator having an open and a closed mode, and xii) a plurality of additional valves, wherein the solar collectors, the first storage tank, the generator, the condenser, the second storage tank, the evaporator, the third storage tank, the absorber, and the heat exchanger are fluidly connected to one another and the generator and first storage tank are connected in parallel to the solar collectors, wherein the first amount of the refrigerant is greater than the second amount of the refrigerant, and wherein the first temperature control valve and the second temperature control valve regulate the flow of the heating fluid into the generator and substantially reduce absorbent crystal formation in the generator relative to a substantially similar absorption cooling system operated in a substantially similar manner without the first temperature control valve, the second temperature control valve or both.

In one embodiment, the absorbent is lithium bromide (LiBr) and the refrigerant is water.

In one embodiment, the first temperature control valve, the second temperature control valve and/or the plurality of additional valves are configured to regulate the consumption of the energy obtained by the solar collectors to maintain continuous cooling of at least one load during times of low solar heat input and/or nighttime operation of the absorption cooling system.

In one embodiment, the heating fluid from the solar collectors flows to the first storage tank when the first temperature control valve is in the open mode.

In one embodiment, the first temperature control valve is in the open mode when the temperature of the heating fluid is greater than or equal to 109° C.

In one embodiment, the heating fluid flows from the first storage tank to the generator when the second temperature control valve is in the open mode.

In one embodiment, the second temperature control valve is in the open mode when the temperature of the heating fluid is less than or equal to 100° C.

In one embodiment, the heating fluid flows from the solar collectors to the generator when the first temperature control valve and the second temperature control valve are both in the closed mode.

In one embodiment, the first temperature control valve and the second temperature control valve are both in the closed mode when the temperature of the heating fluid is greater than 100° C. and less than 109° C.

In one embodiment, the first temperature control valve and the second temperature control valve cannot be in the open mode at the same time.

In one embodiment, the operating temperature in the generator is less than 115° C.

In one embodiment, the first storage tank is further configured to provide heating fluid to an attached building water heater.

In one embodiment, one or more of the plurality of additional valves are closed and one or more of the plurality of additional valves are open during times of standard solar heat input and/or daytime operation of the absorption cooling system.

In one embodiment, the third storage tank is further configured to provide cooling fluid for direct cooling at least one load via one or more of the plurality of additional valves during times of low solar heat input and/or nighttime operation of the absorption cooling system.

In one embodiment, the absorption cooling system further comprises a solution pump located between the absorber and the generator and configured to transfer the dilute absorbent-refrigerant solution from the absorber to the generator via the heat exchanger.

In one embodiment, the solution pump consumes electric power that is less than 0.5% of the total energy consumed by the absorption cooling system.

According to a second aspect, the present disclosure is related to a method of continuously cooling at least one load using the absorption cooling system described herein, comprising: i) transferring solar energy obtained via the plurality of solar collectors as heat to produce the heating fluid, ii) transferring the heating fluid from the solar collectors to the generator comprising the dilute absorbent-refrigerant solution comprising the absorbent dissolved in the first amount of the refrigerant to release the vapor refrigerant from the dilute absorbent-refrigerant solution, iii) condensing the vapor refrigerant to from the liquid refrigerant in the condenser, iv) evaporating the liquid refrigerant in the evaporator to form the cooling fluid for cooling at least one load, v) storing at least one selected from the group consisting of the heating fluid, the liquid refrigerant, and the cooling fluid in at least one selected from the group consisting of the first storage tank, the second storage tank, and the third storage tank for use during times of low solar heat input and/or nighttime operation, vi) regulating, via one or more of the temperature control valves, the flow of heating fluid into the generator to maintain a generator working temperature range that prohibits absorbent crystal formation, and vii) regulating, via one or more of the plurality of additional valves, the flow of the stored refrigerant and/or cooling fluid to maintain continuous cooling of at least one load during times of low solar heat input and/or nighttime operation of the absorption cooling system.

In one embodiment, the method further comprises: i) reforming the dilute absorbent-refrigerant solution comprising the absorbent dissolved in the first amount of the refrigerant in the absorber following the evaporating, and ii) returning the dilute absorbent-refrigerant solution to the generator via a solution pump, wherein the dilute absorbent-refrigerant solution flows through the heat exchanger located between the generator and the absorber from the absorber to the generator counter to the flow of the concentrated absorbent-refrigerant solution comprising the absorbent dissolved in the second amount of the refrigerant through the heat exchanger from the generator to the absorber.

In one embodiment, the absorbent is lithium bromide (LiBr) and the refrigerant is water and the working temperature range that prohibits absorbent crystal formation is less than 115° C.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an exemplary illustration of a solar-powered absorption cooling system, according to certain embodiments.

DETAILED DESCRIPTION OF THE EMBODIMENTS

Referring now to the drawings, wherein, like reference numerals designate identical or corresponding parts throughout the several views.

FIG. 1 is an exemplary illustration of a solar powered absorption cooling system 100.

According to a first aspect, the present disclosure relates to an absorption cooling system 100 comprising: i) a plurality of solar collectors 102 configured to obtain energy and transfer that energy as heat to a heating fluid, ii) a generator 104 comprising a dilute absorbent-refrigerant solution comprising an absorbent dissolved in a first amount of a refrigerant, wherein the generator is configured to receive the heating fluid from the solar collectors 102 and release a vapor refrigerant from the dilute absorbent-refrigerant solution, iii) a condenser 106 configured to receive and condense the vapor refrigerant from the generator 104 to form a liquid refrigerant, iv) an evaporator 108 configured to receive the liquid refrigerant from the condenser 106 and provide the refrigerant and a cooling fluid, wherein the cooling fluid cools at least one load 110, v) an absorber 112 configured to receive the refrigerant from the evaporator 108 and a concentrated absorbent-refrigerant solution comprising the absorbent dissolved in a second amount of the refrigerant from the generator 104 to reform the dilute absorbent-refrigerant solution, vi) a heat exchanger 114 located between the generator 104 and the absorber 112, wherein heat is exchanged between the concentrated absorbent-refrigerant solution flowing from the generator 104 to the absorber 112 and the dilute absorbent-refrigerant solution flowing from the absorber 112 to the generator 104, vii) a first storage tank 116 located downstream of the solar collectors 102 and upstream of the generator 104, which is configured to store the heating fluid, viii) a second storage tank 118 located downstream of the condenser 106 and upstream of the evaporator 108, which is configured to store the refrigerant, ix) a third storage tank 120 located downstream of the evaporator 108, which is configured to store the cooling fluid, x) a first temperature control valve 122 located between the solar collectors 102 and the first storage tank 116 having an open and a closed mode, xi) a second temperature control valve 124 located between the first storage tank 116 and the generator 104 having an open and a closed mode, and xii) a plurality of additional valves such as 126, 128, 130, 132, 134, 136, 138, 140, 142, wherein the solar collectors 102, the first storage tank 116, the generator 104, the condenser 106, the second storage tank 118, the evaporator 108, the third storage tank 120, the absorber 112, and the heat exchanger 114 are fluidly connected to one another and the generator 104 and first storage tank 116 are connected in parallel to the solar collectors 102, wherein the first amount of the refrigerant is greater than the second amount of the refrigerant, and wherein the first temperature control valve 122 and the second temperature control valve 124 regulate the flow of the heating fluid into the generator 104 and substantially reduce absorbent crystal formation in the generator 104 relative to a substantially similar absorption cooling system operated in a substantially similar manner without the first temperature control valve 122, the second temperature control valve 124 or both.

The system components may be directly connected or fluidly connected to one another, for example, by connecting pipes without intervening components. In addition valves may be disposed in a variety of ways, for example, between portions of connecting pipes, or for example, integrally to any additional or other system components. Depending on the size of the solar thermal absorption cooling system described herein the internal diameters of the connecting pipes and valves may have a variable range that depends upon the size of the system and/or the cooling load.

As used herein, absorption cooling systems refer to systems that use a heat source (i.e. solar energy) which provides the energy needed to drive the cooling process. The absorption cooling cycle can be described in three phases: i) evaporation wherein a liquid refrigerant evaporates in a low partial pressure environment, thus extracting heat from its surroundings, the low partial pressure makes the temperature needed for evaporation lower, ii) absorption wherein the now gaseous refrigerant is absorbed by another liquid (i.e. a salt solution) reducing its partial pressure in the evaporator and allowing more refrigerant to evaporate, and iii) regeneration, wherein the refrigerant saturated liquid is heated causing the refrigerant to evaporate out, causing an increase in its partial pressure, without a change in total pressure, the refrigerant is then condensed through a heat exchanger to replenish the supply of liquid refrigerant in the evaporator. A simple absorption system commonly uses a solution of salt and water, water under low pressure is evaporated from the load being chilled, the water is absorbed by a salt/water solution, and the water is driven off the salt/water solution using heat.

Aspects of this disclosure are directed to solar-powered salt/water absorption cooling technologies. The embodiments described herein provide for continuous operation of the cooling system through the use of heating fluid storage, refrigerant storage, and/or cooling fluid storage. As used herein, continuous operation refers to twenty-four hours per day operations in both daytime hours of operation when solar heat input is highest as well as nighttime hours of operation when solar heat input is lowest. In certain implementations, solar thermal storage systems have advantages over other solar thermal cooling systems in terms of system performance improvements and energy savings. One advantage of a solar-thermal cooling system is that it utilizes low grade thermal energy instead of high grade mechanical or mechanical shaft work. Therefore, in a preferred embodiment, the solar thermal cooling system described herein does not include a compressor or any mechanical compressors and/or ejector compressors, making it more economical than comparable mechanical vapor compression systems. The solar thermal cooling system of the present disclosure is less bulky and can possess a higher coefficient of performance than systems employing comparable alternative technologies.

Briefly, solar cooling uses solar thermal collectors to provide solar energy to thermally driven absorption chillers. Solar energy heats a fluid that provides heat to the generator of an absorption chiller and is recirculated back to the collectors. The heat provided to the generator drives a cooling cycle that produces chilled refrigerant (i.e. water). The chilled refrigerant produced is used for cooling in large or small scale as well as commercial and industrial settings preferably in air conditioning applications. The absorption cooling system of the present disclosure is suitable for air conditioning system applications of different sizes, such as large commercial cooling systems and personal cooling systems.

In one embodiment, during daytime (times of normal or above normal solar insolation) operation, heat is provided by a solar collector field which heats up a heating fluid to be provided to a generator. The thermodynamic cycle for the absorption cooling system continues through the day as long as solar energy is available. As used herein, nighttime (times of below normal solar insolation) may be defined in terms of the availability of sunlight, such that night refers to any time when sunlight is not available or is insufficient to operate the system. Alternatively, night may also be defined, for example, in terms of an amount of heat input available from the thermal or solar collectors. Thus, night may be deemed to start even while the sun remains above the horizon, if the thermal solar collectors are unable to provide sufficient heating fluid to the generator to produce refrigerant vapor. In one embodiment, night may be defined in terms of an ambient temperature and thus available heat energy, for example the opening and/or closing of one or more valves may be governed by a thermostat.

In one step of the system, a plurality of solar collectors 102 is configured to obtain energy and transfer that heat to a heating fluid. As used herein, a "solar collector", "solar thermal collector" and/or "collector" collects heat by absorbing sunlight. A solar collector is a device for capturing solar radiation. Solar radiation is energy in the form of electromagnetic radiation from the infrared to the ultraviolet wavelengths. As used herein, the term fluid refers to a liquid, a gas, or a mixture thereof. Solar collectors transform solar radiation into heat and transfer that heat to a medium or heating fluid (i.e. water, air, solar fluid, solar collector fluid, propylene glycol, antifreeze, saline, oil or another fluid suitable for operation as a medium for heat exchange) to provide useful thermal energy. In one embodiment, the heating fluid is water. In certain embodiments, the solar collectors may likewise be used to heat a heating fluid circulating in and out of the solar collector. The solar collectors collect solar energy in the form of heat rather than in the form of electricity or electrical potential. In a preferred embodiment, solar energy is the only heat source and no auxiliary heat source is necessary.

Convection and conduction are the two main modes of heat transfer in a collector and the three main types of solar collectors that are frequently employed in solar cooling technology are flat-plate collectors, evacuated tube collectors and concentrating collectors. In a preferred embodiment, the plurality of solar collectors are flat-plate collectors. The flat-plate collectors may comprise dark flat-plate absorber plates, a transparent or glazing cover that reduces heat loses, heat-transport fluid or heating fluid, recuperating tubes, heat insulating, and other suitable auxiliaries. In another embodiment, the solar collectors may be designed or configured to exploit optical or other properties of sunlight including, but not limited to, absorption, reflection, or refraction to maximize the harnessing of usable energy from sunlight. In a preferred embodiment, the solar collectors need not have any solar energy storage capacity themselves for storing solar energy when sunlight is not available. Rather, the absorption cooling system may continue cooling operations during nights and periods of low solar insolation (operate continuously 24 hours a day) by incorporating one of either heat storage, refrigerant storage, or cold storage capabilities into the system.

In one embodiment, the solar collectors have a collective surface area that depends on the size and demands of the absorption cooling system. As used herein, solar collector efficiency is defined as the ratio between the absorbed energy and the solar radiation and is dependent upon the choice of solar thermal collector.

In one step of the system, a generator 104 comprising a dilute absorbent-refrigerant solution comprising an absorbent dissolved in a first amount of a refrigerant is configured to receive the heating fluid from the solar collectors 102 (and/or the first storage tank 116) and release a vapor refrigerant from the dilute absorbent-refrigerant solution. When the absorbent-refrigerant solution receives heat, the refrigerant (i.e. water) separates from the solution becoming superheated and is released.

In a most preferred embodiment, the absorbent is lithium bromide (LiBr) and the refrigerant is water, thus the absorbent-refrigerant solution is lithium bromide and water. Solid LiBr salt is structurally crystalline in nature. When LiBr is dissolved in water, it becomes an aqueous solution. The nature of LiBr solutions is that the salt component precipitates when the mass fraction of salt exceeds the solubility limit. Lithium bromide has a solubility in water of 166.7 g/100 mL (~63 wt % relative to the total weight of the solution) at 20° C. and a solubility in water of 266 g/100 mL (~73 wt % relative to the total weight of the solution).

The generator may be constructed of a material, such as metal, plastic, ceramic or glass that can withstand the temperatures and pressures associated with receiving the heating fluid from the solar collectors and generating a vapor refrigerant. In one embodiment, the generator comprises a set of tubes routed through an interior of an outer shell that holds the absorbent-refrigerant solution, the heating fluid heated by the solar energy may pass through the tubes and heat the absorbent-refrigerant solution until the refrigerant (i.e. water) is released from the absorbent (i.e. LiBr). Additional configurations of the generator are equally envisaged.

As used herein, the "dilute absorbent-refrigerant solution" is weak in absorbent and strong in refrigerant and preferably has an absorbent mass fraction of less than 63 wt % relative to the total weight of the absorbent-refrigerant solution, preferably less than 62.5 wt %, preferably less than 62 wt %, preferably less than 61 wt %, preferably less than 60 wt %, preferably less than 59 wt %, preferably less than 58 wt %, preferably less than 57 wt %, preferably less than 56 wt %, preferably less than 55 wt %, preferably less than 50 wt %, preferably less than 45 wt %, preferably less than 40% relative to the total weight of the absorbent-refrigerant solution. As the absorbent-refrigerant solution is heated and refrigerant is released from the absorbent and flows to the condenser a concentrated absorbent-refrigerant solution is formed and remains in the generator before flowing to the absorber via expansion valve 126. As used herein, the "concentrated absorbent-refrigerant solution" is strong in absorbent and weak in refrigerant and preferably has an absorbent mass fraction of greater than or equal to 63 wt % relative to the total weight of the absorbent-refrigerant solution, preferably greater than 63.5 wt %/o, preferably greater than 64 wt %, preferably greater than 65 wt %, preferably greater than 66 wt %, preferably greater than 67 wt %, preferably greater than 68 wt %, preferably greater than 69 wt %, preferably greater than 70 wt %, preferably greater than 71 wt %, preferably greater than 71.5 wt %, preferably greater than 72 wt % relative to the total weight of the absorbent-refrigerant solution. The concentrated absorbent-refrigerant solution can be defined as any absorbent-refrigerant solution that is more concentrated in absorbent than the dilute absorbent-refrigerant solution. The dilute absorbent-refrigerant solution comprises an absorbent dissolved in a first amount of refrigerant, the concentrated absorbent-refrigerant solution comprises an absorbent dissolved in a second amount of refrigerant and the first amount of refrigerant is greater than the second amount of refrigerant.

In a preferred embodiment, the heating fluid heated by the solar energy has a temperature of greater than 60° C., preferably greater than 65° C., preferably greater than 70° C., preferably greater than 75° C., preferably greater than 80° C., preferably greater than 85° C., preferably greater than 90° C., preferably greater than 95° C., preferably greater than 96° C., preferably greater than 97° C., preferably greater than 98° C., preferably greater than 99° C. and less than 115° C., preferably less than 114° C., preferably less than 113° C., preferably less than 112° C., preferably less than 111° C., preferably less than 110° C., preferably less than 109° C., preferably less than 105° C., such as, for example in the range of 65-115° C., preferably 70-110° C., preferably 80-105° C., preferably 85-100° C. In a preferred embodiment, the operating temperature within the generator is 85-115° C., preferably 85-110° C., preferably 85-105° C., preferably 90-100° C., preferably 92-98° C. and always less than 115° C., preferably less than 114° C., preferably less than 113° C., preferably less than 112° C., preferably less than 111° C., preferably less than 110° C., preferably less than 109° C., preferably less than 105° C.

In one step of the system, a first storage tank 116 is located downstream of the solar collectors 102 and upstream of the generator 104 and is configured to store the heating fluid. In one step of the system, a first temperature control valve 122 is located between the solar collectors 102 and the first storage tank 116 having an open and a closed mode. In one step of the system, a second temperature control valve 124 is located between the first storage tank 116 and the generator 104.

Thus, the first storage tank (heat storage tank or excess heat storage tank) 116 is used to accommodate any extra heat (during solar insolation times or peak times) in order to avoid crystallization due to the increase in the absorbent-refrigerant concentration (i.e. in LiBr) above the ideal or allowable limit in the generator as a result of too high of a generator temperature and the loss of too much refrigerant (i.e. water) as vapor. The generator temperature may be more than the system requires for non-crystallization operation due to the increase in solar intensity and hence the solar collector output during peak solar insolation time. This excess heat storage tank can additionally be utilized during hours of lower solar insolation and hence reduce the heat required to produce the stored refrigerant, the stored cooling fluid, or the cooling to at least one load.

The first storage tank, or heat storage tank may be constructed of a material, such as metal, plastic, or glass that can withstand the temperatures and pressures of storing heating fluid from the solar collectors and that is compatible with the particular heating fluid employed in the system. The volume, storage pressure, storage temperature and insulation characteristics of the heat storage tank are based on design operational capabilities of the solar powered absorption cooling system described herein. The heat storage tank allows the cooling demands of loads of the solar powered absorption cooling system to be continuously maintained during both daytime and nighttime operations (i.e. periods of normal solar insolation, above normal solar insolation, and below normal solar insolation). The excess heat storage tank can be utilized during hours of lower solar insolation thus reducing the solar heat necessary to produce refrigerant in the system. In addition, the first heat storage tank allows the operational parameters of the generator (i.e. temperature and/or absorbent-refrigerant solution concentration) to be continuously maintained during both daytime and nighttime operations (i.e. periods of normal solar insolation, above normal solar insolation, and below normal solar insolation).

In one embodiment, the first storage tank or excess heat storage tank may be additionally or further configured to supply heating fluid (such as hot water) to an attached building water heater or building heater system. Circulating hot water or heating fluid can be used in a variety of central heating systems, often termed hydronic heating systems. In one embodiment, the circulating water system may use a closed loop where the same water is heated and then reheated. In another embodiment, the building heating system may be a sealed system that provides a form of central heating in which the water used for heating circulates independently of the building's normal water supply.

The first temperature control valve 122 after the collector and the second temperature control valve 124 after the heat storage tank, combine to control and regulate the flow of the heating fluid or solar collector fluid into the generator when the collector fluid temperature has reached its design limit. The design limit is based on the generator working temperature range that prohibits absorbent crystallization from the absorbent-refrigerant solution. The first temperature control valve directs the flow of excess heating fluid to the first storage tank when the collector heating fluid temperature reaches a maximum. The second temperature control valve is used to direct the flow of heating fluid from the first storage tank to the generator when the collector heating fluid temperature falls below a minimum. Thus, the flow of heating fluid to the generator comes from the solar collectors directly (both temperature control valves closed) or from the first heat storage tank (first temperature control valve closed and second temperature control valve open). Both temperature control valves cannot be in an open mode at the same time. Thus, the first temperature control valve and the second temperature control valve regulate the flow of the heating fluid into the generator and substantially reduce absorbent crystal formation in the generator relative to a substantially similar absorption cooling system operated in a substantially similar manner without the first temperature control valve, the second temperature control valve or both. In one embodiment, the absorbent is lithium bromide (LiBr) and the refrigerant is water and the working temperature range that prohibits absorbent crystal formation is less than 115° C., preferably less than 110° C., preferably less than 108° C. At higher temperatures the refrigerant evaporates too much concentrating the absorbent and forcing precipitation/crystallization.

In one step of the system, a plurality of additional valves including, but not limited to valves 126, 128, 130, 132, 134, 136, 138, 140, and 142 are configured along with the first temperature control valve and the second temperature control valve to regulate the consumption of the energy obtained by the solar collectors to maintain continuous cooling of at least one load during both daytime and nighttime operations (i.e. periods of normal solar insolation, above normal solar insolation, and below normal solar insolation). In certain implementation, one or more of the plurality of additional valves are closed and one or more of the plurality of additional valves are open during times of standard solar input and/or daytime operation of the absorption cooling system. For examples, valves 130, 134, 136, 138 are in an open mode in daytime operation and closed in nighttime operations while valves 132, 140 and 142 are in a closed mode in daytime operation and open in nighttime operations.

As used herein, a valve is a device that regulates, directs or controls the flow of a fluid (gases, liquid, fluidized solids or slurries) by opening, closing or partially obstructing various passageways. In an open valve, fluid flows in a direction from higher pressure to lower pressure. Valves vary widely in form, size and application. Valves are quite diverse and may be classified into a number of basic types including, but not limited to hydraulic, pneumatic, manual, solenoid and motor. The main parts of the most usual types of valves are the body and the bonnet. These two parts form the casing that holds the fluid going through the valve. Additional valve components may include, but are not limited to, body, bonnet, ports, handle or actuator, disc, seat, stem, gaskets, valve balls, spring and trim and each part exists in several types and designs. As used herein, a "throttle" or "throttling process" refers to a mechanism by which fluid flow is managed by constriction or obstruction. Thus, passage through a valve, a control valve, or an expansion valve may be considered a throttling process, non-limiting examples of throttling valves include thermostatic expansion valves and float valves. In certain embodiments, the position and operation of the valves can be manually operated to regulate the flow of fluid. Alternatively, the position of the valve can be controlled via circuitry based on changing load demands throughout the nighttime hours.

In certain embodiments, the valves may refer to check valves. Non-limiting exemplary check valves include, but are not limited to, ball check valves, diaphragm check valves, wing check valves, stop-check valves, lift-check valves, in-line check valves, duckbill valves and pneumatic non-return valves.

As used herein, a control valve refers to valves used to control conditions such as flows, pressure, temperature and liquid level by fully or partially opening or closing in response to signal received from controllers that compare a set point to a process variable whose value is provided by sensors that monitors changes in such conditions. In terms of the present disclosure, the sensors monitor temperatures of the heating fluid between the solar collectors 102 and the generator 122 and the control valve is a temperature control valve. The opening or closing of control valves may be done automatically by electrical, hydraulic or pneumatic actuators. Positioners may be used to control the opening or closing of the actuator based on electric or pneumatic signals.

A control valve generally consists of three main parts in which each part exists in several types and designs: a valve actuator, a valve positioner and a valve body. The most common and versatile types of control valves are sliding-stem glove and angle valves due to their rugged construction and the many options available that make them suitable for a variety of process applications. Exemplary suitable control valve types for use as the temperature control valve include, but are not limited to, angle valves (cage-style valves and DiskStack style valves), angle seat piston valves, globe valves (single-port valves, balanded-plug cage-style valves, high capacity cage-guided valves, port-guided single-port valves, double-ported valves, three-way valves), diaphragm valves, rotary valves (butterfly valves, v-notch ball control valves, eccentric-disk control valves, eccentric-plug control valves), sliding cylinder valves (directional control valve, spool valve, piston valve) and air-operated valves (air-operated valves, relay valves, air-operated pinch valves) and the like.

Valve positions or modes are operating conditions determined by the position of the disc or rotor in the valves. Three port valves are valves with three ports that serve many different functions. Three way ball valves come with a T- or an L-shaped fluid passageways in the rotor. The T-valve might be used to permit connection of one inlet to either or both outlets or connection of the two outlets. The L-valve could be used to permit disconnection of both or connection of either but not both of two inlets to one outlet. In a preferred embodiment, the first temperature control valve is a three port valve having a T-shaped fluid passageway. In its closed mode heating fluid flows from the solar collectors (inlet) to the generator (first outlet) and is prevented from flowing to the first storage tank (second outlet). In its open mode heating fluid from the solar collectors (inlet) flows to the fist storage tank (second outlet) and is prevented from flowing to the generator (first outlet).

Two port valves have the operating positions or modes of closed, so that no flow at all goes through and open, or more precisely fully open for maximum flow. Return valves and non-return valves may allow fluid to move in 2 or 1 directions respectively. Although many 2-way valves can be made in which the flow can go in either direction between the two ports, in the present disclosure, flow is expected to go from one certain port on the "upstream" side of the valve to the other port on the "downstream" side of the valve. In a preferred embodiment, the second temperature control valve is a two port valve having a single linear fluid passageway. In its open mode heating fluid flows from the first storage tank (inlet/upstream) to the generator (outlet/downstream) and in its closed mode heating fluid is prevented from flowing from the first storage tank (inlet/upstream) to the generator (outlet/downstream).

In a preferred embodiment, the first temperature control valve is in an open mode when the temperature of the heating fluid is greater than or equal to 109° C., preferably greater than 110° C., preferably greater than 111° C., preferably greater than 112° C., preferably greater than 113° C., preferably greater than 114° C., preferably greater than 115° C. and in a closed mode when the temperature of the heating fluid is less than 109° C., preferably less than 105° C., preferably less than 100° C., preferably less than 95° C., preferably less than 90° C., preferably less than 85° C., preferably less than 80° C. In a preferred embodiment, the second temperature control valve is in the open mode when the temperature of the heating fluid is less than or equal to 100° C., preferably less than 95° C., preferably less than 90° C., preferably less than 85° C., preferably less than 80° C. and in a closed mode when the temperature of the heating fluid is greater than 100° C., preferably greater than 105° C., preferably greater than 110° C., preferably greater than 115° C.

In a preferred embodiment, the first temperature control valve and the second temperature control valve are both in a closed mode and the only flow of heating fluid is from the solar collectors to the generator. In a preferred embodiment, the first temperature control valve and the second temperature control valve are both in a closed mode when the temperature of the heating fluid is greater than 100° C. and less than 109° C., preferably greater than 101° C. and less than 108° C., preferably greater than 102° C. and less than 107° C., preferably greater than 103° C. and less than 106° C., preferably greater than 104° C. and less than 105° C. Therefore, in a preferred embodiment the first temperature control valve and the second temperature control valve cannot be in their respective open modes at the same time.

In one step of the system, a condenser 106 is configured to receive and condense the vapor refrigerant from the generator 104 to form a liquid refrigerant. The vapor refrigerant released from the absorbent-refrigerant solution upon heating in the generator is condensed to a liquid in the condenser. As used herein, a condenser is a device or unit used to condense a substance from its gaseous to its liquid state, by cooling it. In so doing, the latent heat is given up by the substance, and will transfer to the condenser coolant. In one embodiment, the condenser may be constructed of a material such as metal, plastic or glass such as copper such that the condenser can withstand the temperatures and pressures associated with condensing refrigerant vapor (i.e. water) and that is compatible with the particular refrigerant used in the system. Condensers may have various designs and come in many sizes including, but not limited to, surface condensers, condenser units and direct contact condensers. Components such as a condenser may be commercially available and well known to those of ordinary skill in the art. The condenser of the present disclosure may be water-cooled, air-cooled, or evaporative, preferably air-cooled. Use of cooling water or surrounding air as the coolant is common in many condensers. In one embodiment, the condensation may be aided by an air fan 146 that blows cooler ambient air into the condenser. The condenser must have an operating temperature above the ambient temperature, in order to have a driving temperature difference in the condenser for the cooling heat transfer process, preferably by ambient air, during the condensation process.

In a preferred embodiment, the condenser has an operating temperature that is up to 20° C. above the ambient temperature, preferably up to 15° C., more preferably up to 10° C., preferably 2 to 8° C. above the ambient temperature. The ambient temperature generally ranges from 20-50° C., preferably 30-50° C. hence the condenser has an operating temperature of 30-60° C., preferably 40-50° C. In a preferred embodiment, the condenser daylight operating temperature is greater than or equal to the condenser nighttime operating temperature. In a preferred embodiment, the condenser has a daylight operating temperature in the range of 40-50° C., preferably 44-48° C., or about 46° C. and a nighttime operating temperature of 30-40° C., preferably 34-39° C., or about 38° C. In a preferred embodiment, the temperature of the condensate liquid refrigerant exiting the condenser is up to 15° C. above the temperature of the evaporator, preferably up to 12° C., more preferably up to 10° C., or preferably from 2 to 8° C. above the temperature of the evaporator.

In one step of the system, an evaporator 108 is configured to receive the liquid refrigerant from the condenser 106 (and/or the second storage tank 118) and provide refrigerant and a cooling fluid, wherein the cooling fluid cools at least one load 110. In one step of the system a second storage tank 118 is located downstream of the condenser 106 and upstream of the evaporator 108 and is configured to store the refrigerant. In one step of the system a third storage tank 120 is located downstream of the evaporator 108 and is configured to store the cooling fluid.

In one embodiment, the second storage tank or refrigerant storage tank holds condensed liquid refrigerant from the condenser during daytime hours when the solar energy from the solar collectors can maintain operation temperatures of the generator and the rest of the solar powered absorption cooling system. The second storage tank, or refrigerant storage tank may be constructed of a material, such as metal plastic, or glass that can withstand the temperatures and pressures of storing liquid refrigerant from the condenser and that is compatible with the particular refrigerant employed in the system. The volume, storage pressure, storage temperature and insulation characteristics of the refrigerant storage tank may be based on the design operational capabilities of the solar powered absorption cooling system. In some implementations, the storage pressure of the second storage tank or refrigerant tank is the lowest of the three storage tanks, which means that the minimum strength requirements of the refrigerant storage tank may also be reduced. Additionally, the refrigerant storage tank may have thinner insulation relative to the first storage tank and third storage tank, and losses from the tank may be lower than the first storage tank or heating fluid storage tank because the refrigerant storage occurs at approximately room temperature. In a preferred embodiment, the second storage tank or refrigerant storage tank allows the cooling demands of loads of the solar-powered absorption cooling system to be continuously maintained during both daytime and nighttime operations (i.e. periods of normal solar insolation, above normal solar insolation, and below normal solar insolation).

In one embodiment, the second storage tank or refrigerant storage tank is connected downstream of the condenser via condenser outlet valve 130 and refrigerant storage valve 132. In one embodiment, condenser outlet valve 130 remains open during daytime hours to regulate the flow of refrigerant from the condenser to the refrigerant storage tank. In one embodiment, refrigerant isolation valve 132 remains shut during daytime hours such that refrigerant accumulates in the refrigerant storage tank and can used to provide liquid refrigerant to the evaporator during nighttime hours. In one embodiment, the position of the refrigerant storage isolation valve can be manually operated to regulate the flow of refrigerant from the refrigerant storage tank to the evaporator. Alternatively, the position of the valve can be controlled via circuitry based on changing load demands throughout the nighttime hours.

The liquid refrigerant experiences a throttling process as it passes to the evaporator through expansion valve 128. As used herein, an "expansion valve" or "thermal expansion valve" (EV, TEV, TXV or TX valve) refers to a valve component that controls flow in the system and are often generically referred to as "metering devices". In refrigeration and air conditioning systems the expansion valve may control the amount of refrigerant flow into the evaporator thereby controlling the superheating at the outlet of the evaporator. Flow, control, or metering, is accomplished by use of a temperature sensing bulb, filled with a similar gas as in the system that causes the valve to open against the spring pressure in the valve body as the temperature on the bulb increases. As the suction line temperature decreases, the pressure in the bulb decreases as well and therefore the pressure on the spring causing the valve to close decreases. Cooling systems with expansion valves are often more efficient than other designs that do not use one.

In one embodiment, the condenser of the system produces the refrigerant as a high pressure liquid by transferring heat to a lower temperature medium, usually ambient air. Generally, high pressure refrigerant liquid enters the expansion valve where the expansion valve allows a portion to flow. In order for the higher temperature fluid to cool, the flow must be limited to keep the pressure low and allow expansion back into the gas phase. The expansion valve may have sensing bulbs connected to the suction line of the connective piping, and the sensing bulbs give temperature readings to the expansion valve to adjust the flow of the fluid.

Generally, expansion valves are flow restricting devices that cause a pressure drop of the working fluid (i.e. refrigerant). The valve needle remains open during steady state operation. The size of the opening or the position of the needle is related to the pressure and temperature of the evaporator. There are three main parts of the expansion valve that regulate the position of the needle. The sensor bulb, at an end of the evaporator monitors the temperature change of the evaporator. This change in temperature creates a change in pressure on the diaphragm. For example, if the temperature in the evaporator increases, the pressure in the diaphragm increases causing the needle to lower. Lowering the needle allows more of the working fluid (i.e. refrigerant) into the evaporator to absorb heat. The pressure at the inlet of the evaporator may affect the position of the needle and prevent the working fluid from flowing backward. Since the pressure before the valve is higher than the pressure after the valve, the working fluid naturally flows into the evaporator. The pressure at the inlet of the evaporator may act on the diaphragm. There is also a spring providing a constant pressure closing the valve needle. The spring continuously restricts the amount of working fluid entering the evaporator. The pressure spring can be adjusted to increase or decrease pressure based on temperature needs. The pressure created by the spring acts on the opening of the valve. When the pressure of the sensor bulb acting on the diaphragm is greater than the combined pressure of the evaporator and spring, the valve opens to increase the flow rate of the working fluid (i.e. refrigerant). An increase of flow rat lowers the temperature of the evaporator and allows for more heat absorption.

There are two main types of thermal expansion valves, internally or externally equalized. The difference between externally and internally equalized valves is how the downstream pressure affects the position of the needle. In internally equalized valves, the downstream pressure against the diaphragm is the pressure at the inlet of the evaporator, whereas in externally equalized valves, the evaporator pressure against the diaphragm is the pressure at the outlet of the evaporator. Externally equalized expansion valves may compensate for any pressure drop through the evaporator. In terms of the present disclosure, the expansion valves described herein may be internally or externally equalized.

The evaporator evaporates the refrigerant liquid that exists within the throttled refrigerant and forms a refrigerant vapor. In one embodiment, the evaporator may be constructed of a material such as metal, plastic or glass such that the evaporator can withstand the temperatures and pressures associated with evaporating liquid refrigerant (i.e. water) and that is compatible with the particular refrigerant used in the system. Evaporators may have various designs and come in many sizes. Exemplary types of evaporators include, but are not limited to, natural/forced circulation evaporators, falling film evaporators, rising film (long tube vertical) evaporators, climbing and falling film plate evaporators, multiple effect evaporators, and agitated thin film evaporators. Components such as an evaporator may be commercially available and well known to those of ordinary skill in the art. The evaporator may be a bare-tube evaporator, a plate surface evaporator, or a finned evaporator. The refrigerant typically expands within the evaporator which in some embodiments may be maintained at a vacuum. In one implementation, the evaporator may drip or spray the cooling fluid, substantially comprising liquid refrigerant onto tubes providing cooling water flow to the load 110, such as in some implementations one or more rooms of a building.

In a preferred embodiment, the evaporator has an operating temperature, and hence the cooling temperature is in the range of $-15°$ C. to $15°$ C., preferably $-10°$ C. to $15°$ C., preferably $-5°$ C. to $15°$ C., preferably $0°$ C. to $15°$ C., preferably $2°$ C. to $15°$ C., preferably $4°$ C. to $12°$ C., preferably $5°$ C. to $10°$ C., or about $7.5°$ C. when the temperature of air in the exterior is in the range of 20-50° C., preferably 30-45° C., preferably 35-43° C., or about 40° C. As used herein, the "cooling temperature" or "refrigeration temperature" refers to the temperature of the cooled space in the vicinity of the evaporator. In a preferred embodiment, the evaporator receives refrigerant from a source (i.e. the condenser or refrigerant storage tank), preferably by gravity feed in an amount to satisfy the instantaneous cooling load.

The cooling fluid exits the evaporator and provides cooling to the daytime load 110. Valves 136 and 138 may be used to regulate cooling fluid flow and redirect excess cooling fluid to the third storage tank or cooling fluid storage tank 120. The excess cooling fluid is stored in the cooling fluid storage tank until nighttime hours when the heat input from the solar collectors or first storage tank is insufficient to separate the refrigerant from the absorbent-refrigerant solution in the generator. During nighttime operation the excess cooling fluid may be delivered directly to a nighttime load via valve 140 and valve 142 as the third storage tank is further configured to provide cooling fluid for direct cooling to the at least one load. In one implementation, the valves 136, 138, 140, and/or 142 may be manually operated to achieve predetermined rates of cooling fluid flow to cool the daytime load and to store excess cooling fluid in the third storage tank. Alternatively, the position of the valves 136, 138, 140, and/or 142 may be controlled via circuitry based on changing load demands throughout the day.

In one embodiment, the third storage tank or cooling fluid storage tank is introduced downstream of the evaporator and is a pathway for excess cooling fluid or refrigerant being provided to the at least one load flowing through the evaporator outlet valve 138. In one embodiment the cooling fluid storage tank may hold a phase change material to condense the vapor refrigerant produced in the evaporator and store cold thermal fluid or cold fluid energy to provide cooling in full or in a portion to at least one night load. The third storage tank, or cooling fluid storage tank may be constructed of a material, such as metal plastic, or glass that can withstand the temperatures and pressures of storing cooling fluid from the evaporator and that is compatible with the particular cooling fluid employed in the system. The volume, storage pressure, storage temperature and insulation characteristics of the cooling fluid storage tank may be based on the design operational capabilities of the solar powered absorption cooling system. Losses to the environment from the cooling fluid storage tank may be lower than losses from the excess heat storage tank due to lower temperature differences between the working and ambient temperatures.

The third storage tank or cooling fluid storage tank allows the cooling demands of loads of the absorption cooling system to be continuously maintained during both daytime and nighttime operations. The cooling fluid energy storage is achieved by producing cooling effect during the day that is more than the daytime cooling load necessitates. This extra cooling effect or cooling fluid is stored for later use when the solar heat input is insufficient to separate refrigerant from the absorbent-refrigerant solution in the generator. In addition, the second storage tank or refrigerant storage tank is associated with the condenser that produces liquid refrigerant condensate during daytime hours that is more than the daytime cooling load necessitates. This excess refrigerant accumulates in the second storage tank or refrigerant storage tank. This extra stored liquid refrigerant can be throttled during nighttime hours or during periods of low solar insolation to meet the required cooling loads in parallel with the cooling fluid storage supply.

The use of both the second liquid refrigerant storage tank and the third cooling fluid storage tank may have advantages over similar hybrid heat and refrigerant systems and hybrid heat and cooling fluid storage systems. The refrigerant storage tank and cooling fluid storage tank may be smaller compared to hybrid systems employing only one or the other. Additionally, continuous uninterrupted operation may be maintained even if one of the storage tanks is undergoing maintenance or removed for repair. There is also less complexity in the hybrid refrigerant/cooling fluid system with regards to control requirements as fewer valves are repositioned during daytime and nighttime operations compared to systems employing only one or the other.

In one step of the system, an absorber 112 is configured to receive the refrigerant from the evaporator 108 and a concentrated absorbent-refrigerant solution comprising the absorbent dissolved in a second amount of the refrigerant from the generator 104 to reform the dilute absorbent-refrigerant solution. In one step of the system, a heat exchanger 114 is located between the generator 104 and the absorber 112, wherein heat is exchanged between the concentrated absorbent-refrigerated solution flowing from the generator 104 to the absorber 112 and the dilute absorbent-refrigerant solution flowing from the absorber 112 to the generator 104.

The refrigerant produced in the evaporator thus passes to the absorber and is reabsorbed by the concentrated absorbent-refrigerant solution produced in the generator that has undergone a throttling process and passed from the generator to the absorber via expansion valve 126 to reform the dilute absorbent-refrigerant solution. In a preferred embodiment, the absorber has an operating temperature that is up to 20° C. above the ambient temperature, preferably up to 15° C., more preferably up to 10° C., preferably 2 to 8° C. above the ambient temperature. The ambient temperature generally ranges from 20-50° C., preferably 30-50° C. hence the absorber has an operating temperature of 30-60° C., preferably 40-50° C. In a preferred embodiment, the absorber daylight operating temperature is greater than or equal to the absorber nighttime operating temperature. In a preferred embodiment, the absorber has a daylight operating temperature in the range of 40-50° C., preferably 44-48° C., or about 46° C. and a nighttime operating temperature of 30-40° C., preferably 34-39° C., or about 38° C.

In one embodiment, the absorption cooling system further comprises a solution pump 144 located between the absorber and the generator and configured to transfer the reformed dilute absorbent-refrigerant solution from the absorber to the generator via the heat exchanger. According to certain embodiments, all valves in the system are controlled manually or by internal mechanics related to temperature and/or pressure and the pump 144 is the only component of the absorption cooling system that receives electrical power from an external source other than the plurality of solar collectors, thus the total electricity requirement of the whole system is limited to that needed by the solution pump. In a preferred embodiment, the pump 144 consumes electrical power that is less than 0.5% of the total energy consumed by the absorption cooling system, preferably less than 0.4%, preferably less than 0.3%, preferably less than 0.2%, preferably less than 0.1% of the total energy consumed by the absorption cooling system. The reformed dilute absorbent-refrigerant solution is then pumped from the absorber to the generator via pump 144, which completes the cycle of the solar powered absorption cooling system described herein. In a preferred embodiment, the only heat rejected during a cycle of the system is via natural convection or a forced fan.

Between the absorber and the generator, the absorbent-refrigerant solution passes through heat exchanger 114, which increase the efficiency of the absorption cooling system. Heat is exchanged between the relatively warmer concentrated absorbent-refrigerant solution flowing from the generator to the relatively cooler absorber and the dilute absorbent-refrigerant solution flowing from the absorber to the generator. As used herein, a heat exchanger refers to a device used to transfer heat between one or more fluids. The fluids may be separated by a solid wall to prevent mixing or they may be in direct contact. Exemplary heat exchangers may include, but are not limited to, shell and tube heat exchangers, plate heat exchangers, plate and shell heat exchangers, adiabatic wheel heat exchangers, plate fin heat exchangers, pillow plate heat exchangers, pipe coil heat exchangers, fluid heat exchangers, waste heat recovery units, dynamic scraped surface heat exchangers, phase-change heat exchangers, direct contact heat exchangers, and microchannel heat exchangers.

As used herein, the coefficient of performance (COP) refers to the total useful output energy divided by energy input by the operator only. It can also be stated as the efficiency ratio of the amount of heating or cooling provided by a heating or cooling system to the energy consumed by the system. The higher the coefficient of performance, the more efficient the system is. A ratio of work or useful energy output of a system versus the amount of work or energy put in to the system as determined by using the same energy equivalents for energy in and out is used as a as a measure of the steady state performance or energy efficiency of heating, cooling and refrigeration systems and appliances. In a preferred embodiment, the absorption cooling system described herein has a coefficient of performance greater than 0.70, preferably greater than 0.72, preferably greater than 0.74, preferably greater than 0.76, preferably greater than 0.78, preferably greater than 0.80, preferably greater than 0.825, preferably greater than 0.85, preferably greater than 0.9 during times of standard solar heat input and/or daytime operation, as well as during times of low solar heat input and/or nighttime operation.

In a preferred embodiment, the absorption cooling system described herein has a coefficient of performance during times of low solar heat input and/or nighttime operation that is greater than or equal to a coefficient of performance for the absorption cooling system described herein during times of standard solar heat input and/or daytime operation. In one embodiment, the generator 104, condenser 106 and absorber 112 operate only during times of standard solar heat input and/or daytime operation.

According to a second aspect the present disclosure relates to a method of continuously cooling at least one load using the system of the present disclosure described herein in any of its embodiments comprising i) transferring solar energy obtained via the plurality of solar collectors as heat to produce the heating fluid, ii) transferring the heating fluid from the solar collectors to the generator comprising the dilute absorbent-refrigerant solution comprising the absorbent dissolved in the first amount of the refrigerant to release the vapor refrigerant from the dilute absorbent-refrigerant solution, iii) condensing the vapor refrigerant to form the liquid refrigerant in the condenser, iv) evaporating the liquid refrigerant in the evaporator to form the cooling fluid for cooling at least one load, v) storing at least one selected from the group consisting of the heating fluid, the liquid refrigerant, and the cooling fluid in at least one selected from the group consisting of the first storage tank, the second storage tank, and the third storage tank for use during times of low solar heat input and/or nighttime operation, vi) regulating, via one or more of the temperature control valves, the flow of heating fluid into the generator to maintain a generator working temperature range that prohibits adsorbent crystal formation, and vii) regulating, via one or more of the plurality of additional valves, the flow of the stored refrigerant and/or cooling fluid to maintain continuous cooling of at least one load during times of low solar heat input and/or nighttime operation of the absorption cooling system.

In one embodiment, the method further comprises: i) reforming the dilute absorbent-refrigerant solution comprising the absorbent dissolved in the first amount of the refrigerant in the absorber following the evaporating, and ii) returning the dilute absorbent-refrigerant solution to the generator via a solution pump, wherein the dilute absorbent-refrigerant solution flows through the heat exchanger located between the generator and the absorber from the absorber to the generator counter to the flow of the concentrated absorbent-refrigerant solution comprising the absorbent dissolved in the second amount of the refrigerant through the heat exchanger from the generator to the absorber.

In one embodiment, the absorbent is lithium bromide (LiBr) and the refrigerant is water and the working temperature range that prohibits absorbent crystal formation is less than 115° C. In a preferred embodiment, the operating temperature within the generator is 85-115° C., preferably 85-110° C., preferably 85-105° C., preferably 90-100° C., preferably 92-98° C. and always less than 115° C., preferably less than 114° C., preferably less than 113° C., preferably less than 112° C., preferably less than 111° C., preferably less than 110° C., preferably less than 109° C., preferably less than 105° C.

The steps of the method can be applied to the embodiments of the solar-powered absorption cooling system describe previously herein and the cooling fluid or air cooled by the cooling fluid may be distributed in a building and/or a refrigerator via ducts and/or blower systems. In one embodiment, the solar collectors, the first storage tank, the generator, the condenser, the second storage tank, the evaporator, the third storage tank, the absorber, and the heat exchanger are fluidly connected to one another and the generator and the first storage tank are connected in parallel to the solar collectors.

In one embodiment, at least one of the aforementioned elements of the system may be installed in cooling devices, which include air conditioners and refrigerators, to provide a refrigeration or cooling effect produced by the aforementioned method. For example, an air conditioner may house the generator, condenser, evaporator, absorber, heat exchanger and excess heat storage tank, refrigerant storage tank and cold storage tank, while the solar collector may be installed outside of the building. In some embodiments, the absorption cooling system may employ a water-cooled condenser, and the condenser may be located outside of the air conditioner Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An absorption cooling system, comprising:
a plurality of solar collectors configured to obtain energy and transfer that energy as heat to a heating fluid;
a generator comprising a dilute absorbent-refrigerant solution comprising an absorbent dissolved in a first amount of a refrigerant, wherein the generator is configured to receive the heating fluid from the solar collectors and release a vapor refrigerant from the dilute absorbent-refrigerant solution;
a condenser configured to receive and condense the vapor refrigerant from the generator to form a liquid refrigerant;
an evaporator configured to receive the liquid refrigerant from the condenser and provide refrigerant and a cooling fluid, wherein the cooling fluid cools at least one load;
an absorber configured to receive the refrigerant from the evaporator and a concentrated absorbent-refrigerant solution comprising the absorbent dissolved in a second amount of the refrigerant from the generator to reform the dilute absorbent-refrigerant solution;
a heat exchanger located between the generator and the absorber, wherein heat is exchanged between the concentrated absorbent-refrigerant solution flowing from the generator to the absorber and the dilute absorbent-refrigerant solution flowing from the absorber to the generator;
a first storage tank located downstream of the solar collectors and upstream of the generator, which is configured to store the heating fluid;
a second storage tank located downstream of the condenser and upstream of the evaporator, which is configured to store the liquid refrigerant;
a third storage tank located downstream of the evaporator, which is configured to store the cooling fluid;
a first temperature control valve located between the solar collectors and the first storage tank having an open and a closed mode;
a second temperature control valve located between the first storage tank and the generator having an open and a closed mode; and
a plurality of additional valves;
wherein the solar collectors, the first storage tank, the generator, the condenser, the second storage tank, the evaporator, the third storage tank, the absorber, and the heat exchanger are fluidly connected to one another and the generator and first storage tank are connected in parallel to the solar collectors;
wherein the first amount of the refrigerant is greater than the second amount of the refrigerant; and
wherein the first temperature control valve and the second temperature control valve are configured to regulate a flow of the heating fluid into the generator by automatically toggling between the open mode or the closed mode in response to a controller signal indicating a presence or an absence of a set point of a solid absorbent content in the dilute absorbent-refrigerant solution of the generator.

2. The absorption cooling system of claim 1, wherein the absorbent is lithium bromide (LiBr) and the refrigerant is water.

3. The absorption cooling system of claim 1, wherein the first temperature control valve, the second temperature control valve, and/or the plurality of additional valves are configured to regulate the consumption of energy obtained by the solar collectors to maintain continuous cooling of at least one load during times of low solar heat input and/or nighttime operation of the absorption cooling system.

4. The absorption cooling system of claim 1, wherein a coefficient of performance for the absorption cooling system during times of low solar heat input and/or nighttime operation is greater than or equal to a coefficient of performance for the absorption cooling system during times of standard solar heat input and/or daytime operation.

5. The absorption cooling system of claim 1, wherein
the heating fluid flows from the solar collectors to the generator and does not flow into or out of the first storage tank when the first temperature control valve is in the closed mode and the second temperature control valve is in the closed mode;
the heating fluid flows from the solar collectors to the first storage tank and does not flow into the generator or out of the first storage tank when the first temperature control valve is in the open mode and the second temperature control valve is in the closed mode; and
the heating fluid flows from the first storage tank to the generator and from the solar collectors to the generator and does not flow into the first storage tank when the first temperature control valve is in the closed mode and the second temperature control valve is in the open mode.

6. The absorption cooling system of claim 5, wherein the solid absorbent content in the dilute absorbent-refrigerant solution of the generator is present and the controller signal is an amount of precipitation of the absorbent in the dilute absorbent-refrigerant solution of the generator.

7. The absorption cooling system of claim 5, wherein the controller signal is a mass fraction of the absorbent relative to the total weight of the dilute absorbent-refrigerant solution of the generator.

8. The absorption cooling system of claim 7, wherein
the first temperature control valve is in the closed mode and the second temperature control valve is in the open mode when the mass fraction of the absorbent relative to the total weight of the dilute absorbent-refrigerant solution of the generator is less than or equal to 63 wt %;
the first temperature control valve is in the closed mode and the second temperature control valve is in the closed mode when the mass fraction of the absorbent relative to the total weight of the dilute absorbent-refrigerant solution of the generator is greater than 63 wt % and less than 73 wt %;
the first temperature control valve is in the open mode and the second temperature control valve is in the closed mode when the mass fraction of the absorbent relative to the total weight of the dilute absorbent-refrigerant solution of the generator is greater than or equal to 73 wt %.

9. The absorption cooling system of claim 5, wherein the controller signal is a temperature of the heating fluid entering the generator.

10. The absorption cooling system of claim 9, wherein
the first temperature control valve is in the closed mode and the second temperature control valve is in the open mode when the temperature of the heating fluid entering the generator is less than or equal to 100° C.;
the first temperature control valve is in the closed mode and the second temperature control valve is in the closed mode when the temperature of the heating fluid entering the generator is greater than 100° C. and less than 109° C.; and
the first temperature control valve is in the open mode and the second temperature control valve is in the closed mode when the temperature of the heating fluid entering the generator is greater than or equal to 109° C.

11. The absorption cooling system of claim 1, wherein the first temperature control valve and the second temperature control valve cannot be in the open mode at the same time.

12. The absorption cooling system of claim 1, wherein the operating temperature in the generator is less than 115° C.

13. The absorption cooling system of claim 1, wherein the first storage tank is further configured to provide heating fluid to an attached building water heater.

14. The absorption cooling system of claim 1, wherein one or more of the plurality of additional valves are open during times of standard solar heat input and/or daytime operation of the absorption cooling system.

15. The absorption cooling system of claim 1, wherein the third storage tank is further configured to provide cooling fluid for direct cooling at least one load via one or more of the plurality of the additional valves during times of low solar heat input and/or nighttime operation of the absorption cooling system.

16. The absorption cooling system of claim 1, further comprising a solution pump located between the absorber and the generator and configured to transfer the dilute absorbent-refrigerant solution from the absorber to the generator via the heat exchanger.

17. The absorption cooling system of claim 16, wherein the solution pump consumes electric power that is less than 0.5% of the total energy consumed by the absorption cooling system.

18. A method of continuously cooling at least one load using the system of claim 1, comprising:
transferring solar energy obtained via the plurality of solar collectors as heat to produce the heating fluid;
transferring the heating fluid from the solar collectors to the generator comprising the dilute absorbent-refrigerant solution comprising the absorbent dissolved in the first amount of the refrigerant to release the vapor refrigerant from the dilute absorbent-refrigerant solution;
condensing the vapor refrigerant to form the liquid refrigerant in the condenser;
evaporating the liquid refrigerant in the evaporator to form the cooling fluid for cooling at least one load;
storing at least one selected from the group consisting of the heating fluid, the liquid refrigerant, and the cooling fluid in at least one selected from the group consisting of the first storage tank, the second storage tank, and the third storage tank for use during times of low solar heat input and/or nighttime operation;
regulating via the first temperature control valve, the second temperature control valve, or both the flow of heating fluid into the generator in response to a controller signal indicating the presence or absence of a set point of the solid absorbent content in the dilute absorbent-refrigerant solution of the generator; and
regulating, via one or more of the plurality of additional valves, the flow of the stored refrigerant and/or cooling fluid to maintain continuous cooling of at least one load during times of low solar heat input and/or nighttime operation of the absorption cooling system.

19. The method of claim 18, further comprising:
reforming the dilute absorbent-refrigerant solution comprising the absorbent dissolved in the first amount of the refrigerant in the absorber following the evaporating; and
returning the dilute absorbent-refrigerant solution to the generator via a solution pump;
wherein the dilute absorbent-refrigerant solution flows through the heat exchanger located between the generator and the absorber from the absorber to the generator counter to the flow of the concentrated absorbent-refrigerant solution comprising the absorbent dissolved in the second amount of the refrigerant through the heat exchanger from the generator to the absorber.

20. The method of claim 18, wherein the absorbent is lithium bromide (LiBr) and the refrigerant is water and the controller signal is at least one selected from the group consisting of
a mass fraction of the absorbent relative to the total weight of the dilute absorbent-refrigerant solution of the generator;
a temperature of the heating fluid entering the generator; and
an amount of precipitation of the absorbent in the dilute absorbent-refrigerant solution of the generator wherein a solid absorbent content in the dilute absorbent-refrigerant solution of the generator is present.

\* \* \* \* \*